United States Patent
Han et al.

(10) Patent No.: US 12,540,886 B2
(45) Date of Patent: Feb. 3, 2026

(54) METHOD FOR MANAGING SANDING VOLUME EXPECTATION IN WEAK SANDSTONE BASED ON PLASTIC ZONE VOLUME

(71) Applicant: ARAMCO SERVICES COMPANY, Houston, TX (US)

(72) Inventors: Yanhui Han, Houston, TX (US); Feng Liang, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 314 days.

(21) Appl. No.: 18/478,668

(22) Filed: Sep. 29, 2023

(65) Prior Publication Data

US 2025/0110031 A1 Apr. 3, 2025

(51) Int. Cl.
| | |
|---|---|
| *G01N 3/08* | (2006.01) |
| *C09K 8/575* | (2006.01) |
| *E21B 33/138* | (2006.01) |
| *E21B 49/02* | (2006.01) |
| *G01N 33/24* | (2006.01) |

(52) U.S. Cl.
CPC ............ *G01N 3/08* (2013.01); *C09K 8/5751* (2013.01); *E21B 49/02* (2013.01); *G01N 33/24* (2013.01); *E21B 33/138* (2013.01)

(58) Field of Classification Search
CPC .......... G01N 3/08; G01N 33/24; E21B 49/02; E21B 33/138; C09K 8/5751
See application file for complete search history.

(56) References Cited

U.S. PATENT DOCUMENTS

| | | | |
|---|---|---|---|
| 5,103,428 A | * | 4/1992 | Yale ............... E21B 49/005 367/27 |
| 7,653,488 B2 | | 1/2010 | Mese et al. |
| 8,280,709 B2 | | 10/2012 | Koutsabeloulis et al. |
| 9,026,419 B2 | | 5/2015 | Dean et al. |
| 9,189,576 B2 | * | 11/2015 | Kim ................. G06F 30/00 |
| 10,633,954 B2 | | 4/2020 | Han et al. |

(Continued)

OTHER PUBLICATIONS

Gajo et al. "Finite element simulations of chemo-mechanical coupling in elastic-plastic homoionic expansive clays", Computer Methods in Applied Mechanics and Engineering, vol. 192, Issues 31-32, Aug. 1, 2003, pp. 3489-3530. <https://doi.org/10.1016/S0045-7825(03)00355-4> (Year: 2003).*

(Continued)

*Primary Examiner* — Jonathan M Dunlap
(74) *Attorney, Agent, or Firm* — Osha Bergman Watanabe & Burton LLP

(57) ABSTRACT

Described is a method for managing an expectation on sanding volume in weak sandstone. In situ data related to a region of sandstone proximate a well is acquired. Measured property data corresponding to samples from the region of sandstone are obtained, and a chemical consolidation treatment is performed on the samples. Chemical consolidation treatment data is then obtained. The measured property data and the chemical consolidation treatment data is supplied as inputs to a simulator. The simulator performs simulations with and without chemical consolidation treatment. Based on the simulations, a correlation between a well flow rate and an effect of the chemical consolidation treatment is determined.

19 Claims, 12 Drawing Sheets

(56) References Cited

U.S. PATENT DOCUMENTS

| | | | |
|---|---|---|---|
| 11,186,761 B2* | 11/2021 | Egermann | C04B 14/04 |
| 11,268,366 B2* | 3/2022 | Nguyen | C09K 8/80 |
| 2014/0278315 A1* | 9/2014 | Kim | G06F 30/00 |
| | | | 703/10 |
| 2019/0012414 A1 | 1/2019 | Bere et al. | |
| 2020/0048530 A1* | 2/2020 | Nguyen | E21B 43/267 |
| 2020/0140741 A1* | 5/2020 | Egermann | C09K 8/572 |

OTHER PUBLICATIONS

Fetrati et al. "Numerical simulation of sanding using a coupled hydro-mechanical sand erosion model", Journal of Rock Mechanics and Geotechnical Engineering, vol. 12, Issue 4, Aug. 2020, pp. 811-820. <https://doi.org/10.1016/j.jrmge.2019.12.017> (Year: 2020).*

Hasmin et al. "Application of Resin Sand Consolidation as Primary Sand Control: Case Study of a New Development Well in Offshore Sarawak", Abu Dhabi International Petroleum Exhibition and Conference, Oct. 31, 2022. <https://doi.org/10.2118/211561-MS> (Year: 2022).*

Alakbari et al. "Chemical Sand Consolidation: From Polymers to Nanoparticles", Polymers, vol. 12, Iss. 5, May 7, 2020 <https://doi.org/10.3390/polym12051069> (Year: 2020).*

Ali et al., "The effect of overburden pressure on relative permeability," Society of Petroleum Engineers, SPE 15730, Mar. 7, 1987, pp. 335-340, 6 pages.

D.H. Gray and I. Fatt, "The effect of stress on permeability of sandstone cores," Society of Petroleum Engineers Journal, 3(02), Jun. 1963, pp. 95-100, 6 pages.

Han, "An Integrative Numerical Modeling Framework for Attacking Sand Production Problem," In 48th US Rock Mechanics/Geomechanics Symposium. ARMA-14-7486, Jun. 1, 2014, 8 pages.

Kozhagulova et al., "Experimental and Analytical Investigation of Sand Production in Weak formations for Multiple Well Shut-Ins," Journal of Petroleum Science and Engineering, Aug. 21, 2020, 13 pages.

Louis et al., "Characterization of pore-space heterogeneity in sandstone by X-ray computed tomography," Geological Society, London, Special Publications, 284(1), Jan. 2007, pp. 127-146, 20 pages.

Morad et al., "The impact of diagenesis on the heterogeneity of sandstone reservoirs: A review of the role of depositional facies and sequence stratigraphy," Aug. 2010, AAPG bulletin, 94(8), pp. 1267-1309, 43 pages.

Petunin et al., "An experimental study for investigating the stress dependence of permeability in sandstones and carbonates," 45th US Rock Mechanics/Geomechanics Symposium, ARMA 11-279, Jun. 26, 2011, 9 pages.

Risnes et al., "Sand stresses around a wellbore," Society of Petroleum Engineers Journal, 22(06), Dec. 1982, pp. 883-898, 16 pages.

Shabdirova et al., "Role of plastic zone porosity and permeability in sand production in weak sandstone reservoirs," Underground Space 7, May 6, 2022, pp. 1003-1020, 18 pages.

Shabdirova et al., "A sand production prediction model for weak sandstone reservoir in Kazakhstan," Journal of Rock Mechanics and Geotechnical Engineering 11, May 2, 2019, pp. 760-769, 10 pages.

Yan et al., "Pressure Behavior Analysis of Permeability Changes Due to Sand Production in Offshore Loose Sandstone Reservoirs Using Boundary-Element Method," Hindawi-Geofluids, Feb. 23, 2021, 10 pages.

* cited by examiner

METHOD FOR MANAGING SANDING VOLUME EXPECTATION IN WEAK SANDSTONE BASED ON PLASTIC ZONE VOLUME

BACKGROUND

Weak sandstone reservoirs are prone to migration of reservoir sand into the wellbore or near-wellbore area. Migration of sand, also referred to as sand production, is detrimental to the production of the well through reduced production rates, sand bridging, erosion of equipment, and sand disposal and removal. One factor to assess the risk of sand production for a particular well is whether the production of solid materials can be maintained below an acceptable level at the anticipated flow rates and if the producing condition will make the well production acceptable.

Factors that may influence the tendency of a well to be prone to sand production include degree of consolidation of the formation, production rate of the reservoir fluids, pressure drawdown, reduction of the pore pressure, reservoir fluid viscosity, and the volume/amount of water production. The production of sands may be mitigated by mechanical methods or chemical methods. Mechanical methods of sand control prevent sand production by filtering or blocking flow of sands from the formation with liners, sand screens, or gravel packs. Chemical control methods involve injecting resins into the formation to consolidate the sand grains. However, in addition to enhancing the mechanical strength of the formation, chemical consolidation treatment may introduce a disadvantageous effect. For instance, the permeability of the treated sandstone may decrease, which may impact the well's production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for sand control for wells in a weak sandstone reservoir. In situ data related to a region of sandstone proximate a well in a formation is acquired. Next, a set of measured property data corresponding to one or more samples from the region of sandstone is obtained. A chemical consolidation treatment is performed on the one or more samples, and a set of chemical consolidation treatment data is obtained. The set of measured property data and the set of chemical consolidation treatment data is supplied as inputs to a simulator. Using the simulator, a first simulation with chemical consolidation treatment and a second simulation without chemical consolidation treatment are performed. Based on the first and second simulations, a correlation between a well flow rate and an effect of the chemical consolidation treatment is determined.

In another aspect, the correlation is determined by generating at least one flow rate-plastic zone volume curve.

In another aspect, a flow rate-plastic zone curve is generated for each of the first simulation and the second simulation.

In another aspect, the well flow rate is adjusted based on the correlation.

In another aspect, the effect of the chemical consolidation treatment is a change in a plastic zone volume.

In another aspect, a production rate for managing the expectation on sanding volume is determined using the determined correlation as a reference.

In another aspect, the simulator is a hydromechanical elastoplastic simulator.

In another aspect, the in situ data comprises one or more of a tangential stress around the well, a reservoir pore pressure, a thickness of the region of sandstone, and a borehole radius.

In another aspect, the set of measured property data comprises at least one of a mechanical property, a hydraulic property, a density property, and a stress-dependent permeability property.

In another aspect, the chemical consolidation treatment comprises injecting a volume of treatment fluid into the one or more samples under conditions representative of downhole conditions, where the treatment fluid comprises a resin material. The treatment fluid is allowed to soak into the one or more samples for a predetermined length of time prior to obtaining the set of chemical consolidation treatment data.

In another aspect, the mechanical property is one or more of Young's modulus, Poisson's ratio, uniaxial compressive strength (UCS), friction angle, and tensile strength.

In another aspect, the mechanical property is cohesive strength, and cohesive strength is measured along a treatment depth using a compression test.

In another aspect, the compression test is a uniaxial compression test or a triaxial compression test.

In another aspect, the hydraulic property is one or more of porosity and permeability.

In another aspect, obtaining the set of chemical consolidation treatment data comprises measuring one or more of a chemical treatment depth, variations of cohesive strength, and permeability along the chemical treatment depth.

In another aspect, the simulator is developed by generating a computational mesh having a plurality of regions, assigning the set of measured property data to the plurality of regions of the computational mesh and setting initial conditions and boundary conditions.

In another aspect, the initial conditions comprise one or more of in-situ stresses and pore pressure in the formation.

In another aspect, the computational mesh is a quarter cylindrical mesh.

In another aspect, wherein density properties, mechanical properties, and hydraulic properties are assigned to the plurality of regions of the computational mesh.

In another aspect, performing the first and second simulations comprises simulating one or more of a fluid-mechanical coupling, a stress-dependent porosity, a stress-dependent permeability, and a plastic zone volume for various flow rates.

Other aspects and advantages of the claimed subject matter will be apparent from the following description and the appended claims.

DETAILED DESCRIPTION

Figure 1A:
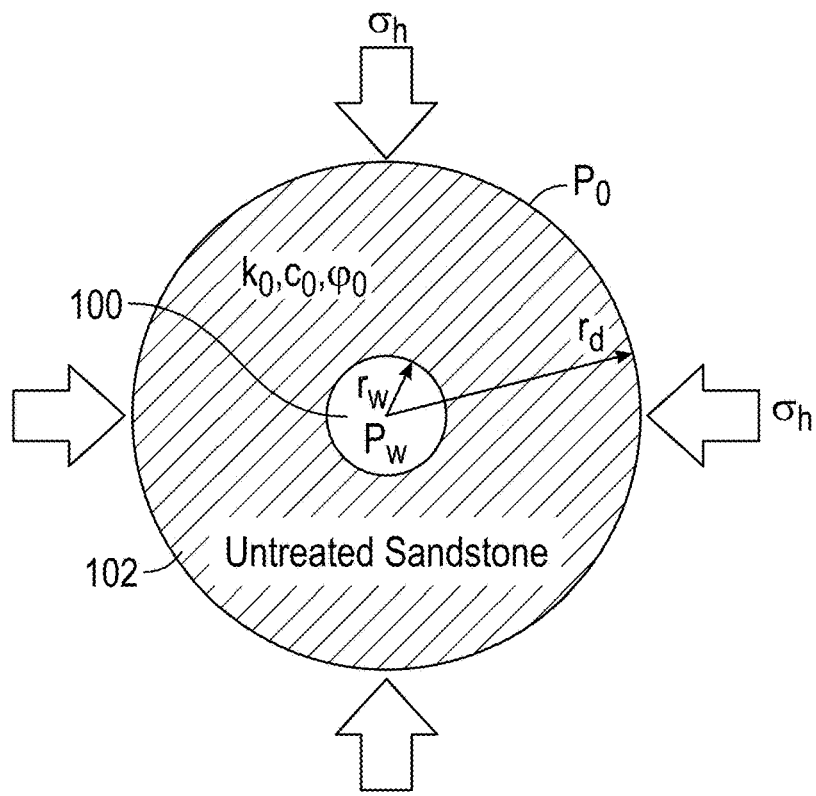
FIG. 1A is an illustration of sand production around a well located in a weak sandstone reservoir subject to loading of an equal stress field according to one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-14, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a passive soil gas sample system" includes reference to one or more of such systems.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In one aspect, embodiments disclosed herein relate to a method for sand control for wells in weak sandstone reservoirs. In one or more embodiments, various characteristics of sandstone with and without chemical consolidation treatment are simulated to predict and manage a sanding risk. Sandstone characteristics are supplied as inputs to a hydromechanical elastoplastic simulator. Sandstone characteristics that may be provided as input to the simulator include treatment depth, bonding strength and degraded permeability in a treated zone, mechanical and hydraulic properties of sandstone, in situ stresses, reservoir pressure, and borehole geometry.

In one or more embodiments, two flow rate-plastic zone volume curves are generated from two series of simulations, one using a set of data obtained following chemical consolidation treatment and one using a set of data obtained without treatment. Sanding risk may be managed by adjusting the flow rate following the curves, as described in detail below.

(1) Production Rate and Plastic Damage

FIG. 1A illustrates a producing well (100) in a weakly consolidated untreated sandstone reservoir in an equal stress field ($\sigma_H=\sigma_h$). $P_o$ is the origin reservoir pore pressure, and $P_w$ is the wellbore fluid pressure, or bottom hole pressure. Untreated sandstone (102), which is considered an elastic region, is present in a region proximate the producing well (100). $R_w$ and $R_d$ are the well radius and drainage zone radius, respectively. The well production rate (q) is determined by the difference between $P_o$ and $P_w$ (so-called drawdown), the viscosity of the fluid ($\mu$), the permeability of the sandstone (k), and the sandstone reservoir thickness (h). For example, the well flow rate, or well production rate, for FIG. 1A may be calculated according to the following:

$$q = \frac{k_0 h(P_0 - P_w)}{\mu \ln \frac{R_d}{R_w}}. \quad (1)$$

Figure 1B:
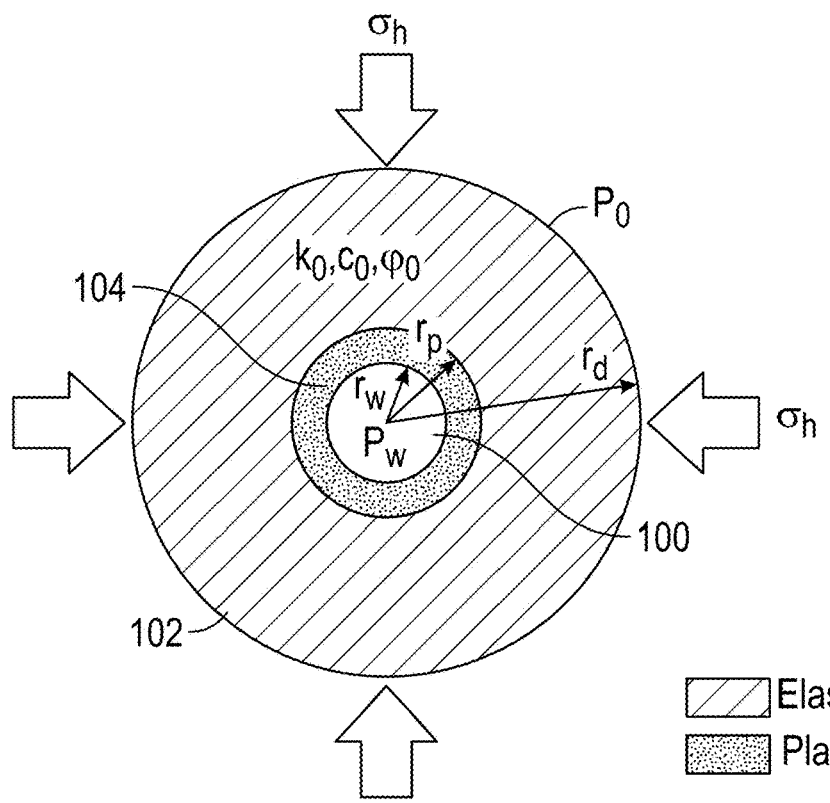
FIG. 1B is an illustration of sand production and a plastic damage zone around a well located in a weak sandstone reservoir subject to loading of an equal stress field according to one or more embodiments of the present disclosure.

An efficient and operable way to increase the production rate is to reduce the bottom hole pressure ($P_w$). However, reducing bottom hole pressure ($P_w$) has the effect of decreasing the pore pressure ($p_p$) near the well (100), which increases the effective tangential stress ($\sigma'_{\theta\theta}$; sign conversion for stress is positive in compression). FIG. 1B is an illustration of sand production and a plastic damage zone around the well (100) located in a weak untreated sandstone reservoir subject to loading of an equal stress field. As shown, untreated sandstone (102) surrounds the well (100), and a portion of the untreated sandstone (102) has become a plastic zone (104). $r_p$ represents the plastic damage radius.

Figure 2:
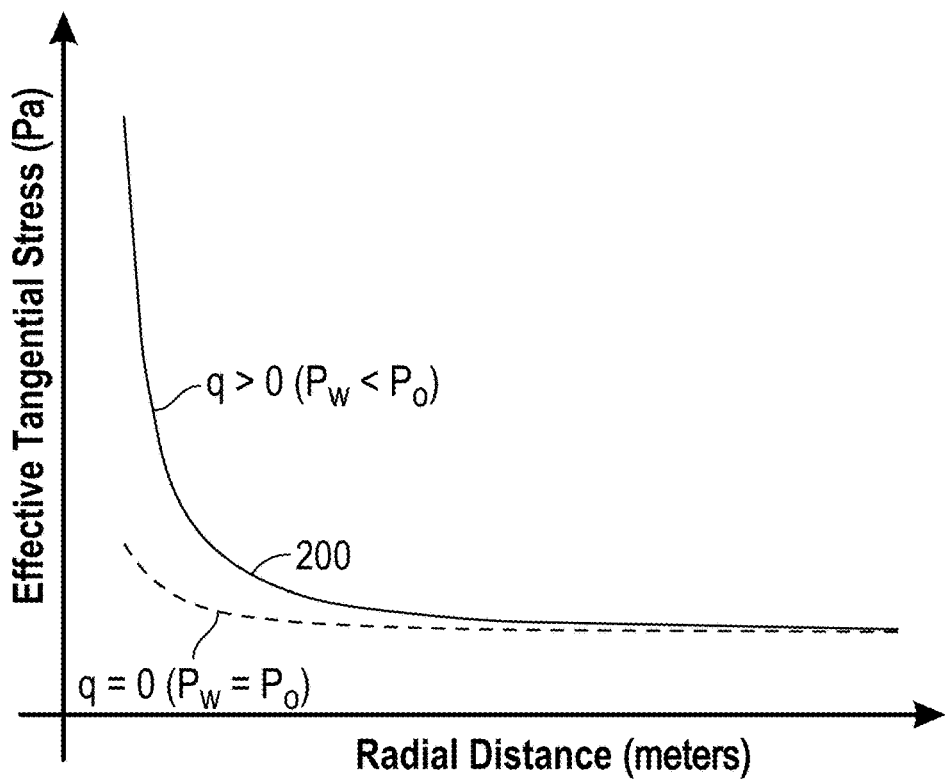
FIG. 2 is an illustration of an effective tangential stress around a well located in an elastic porous media subject to loading of an equal stress field according to one or more embodiments of the present disclosure.

FIG. 2 depicts the effective tangential stress around a well located in an elastic porous media subject to loading of equal stress field. As shown, when bottom hole pressure $P_w$ is less than origin reservoir pore pressure $P_o$, the well production rate q is greater than zero (curve (200)). In this scenario, effective tangential stress is high close to the well (i.e., lower radial distance) and decreases as radial distance from the well increases. When bottom hole pressure $P_w$ and origin reservoir pore pressure $P_o$ are equal and the well production rate q is zero (curve (202)), radial distance from the well does not have a significant effect on effective tangential stress. When the effective tangential stress exceeds the compressive strength, plastic yielding (i.e., damage) may occur. For instance, on the wellbore surface, the compressive failure occurs if:

$$\sigma'_{\theta\theta} = \sigma_{\theta\theta} - p_p \geq \frac{2S_0 \cos\varphi}{1 - \sin\varphi}, \quad (2)$$

where $\varphi$ is the friction angle, and $S_0$ is the cohesive strength, which is a mechanical strength property. As a result, the near-wellbore region becomes more prone to plastic yielding. The sanding risk may be changed by modifying formation stress state or mechanical strength of the formation. Chemical consolidation treatment is based on the mechanism presented in Eq. (2). That is, suppressing the development of a plastic zone by chemical means, such as injecting resin material into the formation, acts to increase the cohesive strength $S_0$ between solid grains of the sandstone.

(2) Plastic Damage and Sand Production

Plastic damage is the prerequisite for sand production. In a region with plastic damage, some solid grains may be dragged by the pore fluids or scoured by the channel fluid flow. The solid grains may then be transported to the producing well with the result that some amount of sand grains detached from the reservoir formation is produced together with the reservoir fluids. Accurately modeling these processes and reliably estimating produced sand volume is a challenging issue that may require extensive laboratory experiments and modeling of poromechanics and hydrodynamic erosion processes.

(3) Primary Affecting Factors (3.1) Unequal Stress Field

Figure 3A:
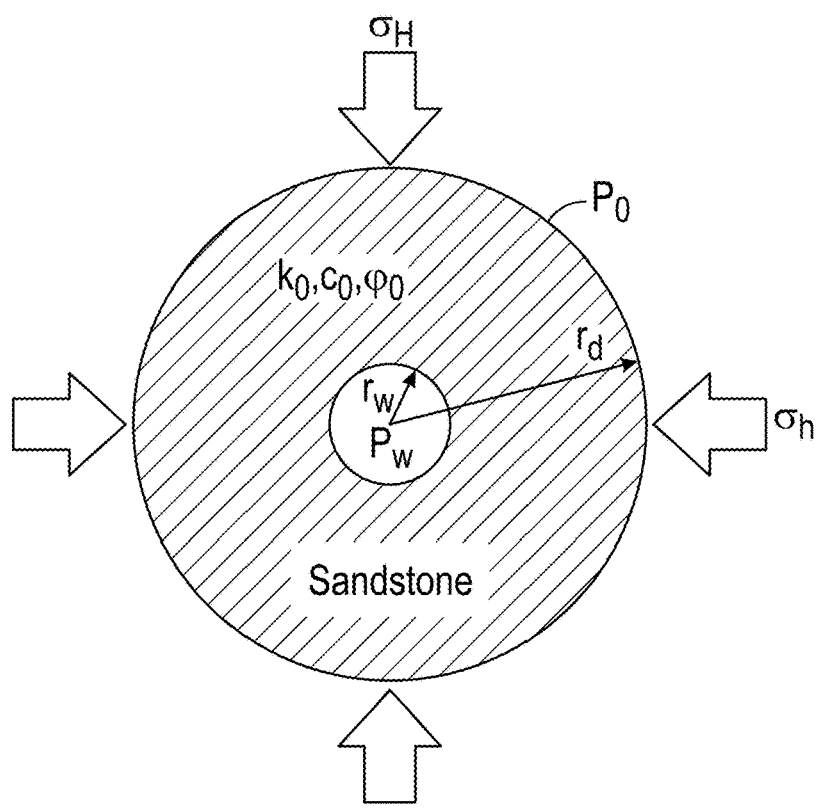
FIG. 3A is an illustration of sand production around a well located in a weak sandstone reservoir in an unequal stress field according to one or more embodiments of the present disclosure.
Figure 3B:
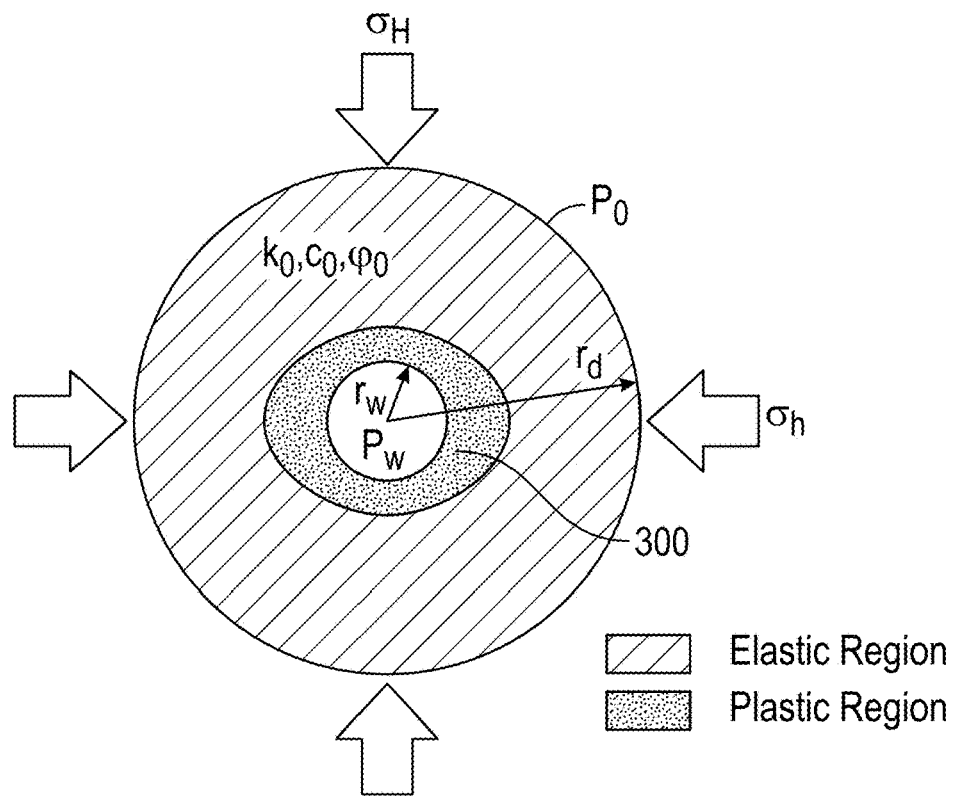
FIG. 3B is an illustration of sand production and a plastic damage zone around a well located in a weak sandstone reservoir in an unequal stress field according to one or more embodiments of the present disclosure.

FIG. 3A is an illustration of sand production around a well located in a weak sandstone reservoir in an unequal stress field. FIG. 3B is an illustration of sand production and a plastic zone 300 around a well located in a weak sandstone reservoir in an unequal stress field. In many cases, the in-situ stresses of sandstone reservoirs are unequal (i.e., $\sigma_H \neq \sigma_h$). As a result, and as shown in FIG. 3B, the shape of the plastic zone 300 is not circular but elliptic. Currently, there is no analytical solution for calculating the plastic zone size/volume around a well subjected to loading of unequal stresses.

(3.2) Chemical Consolidation Effects

Figure 4:
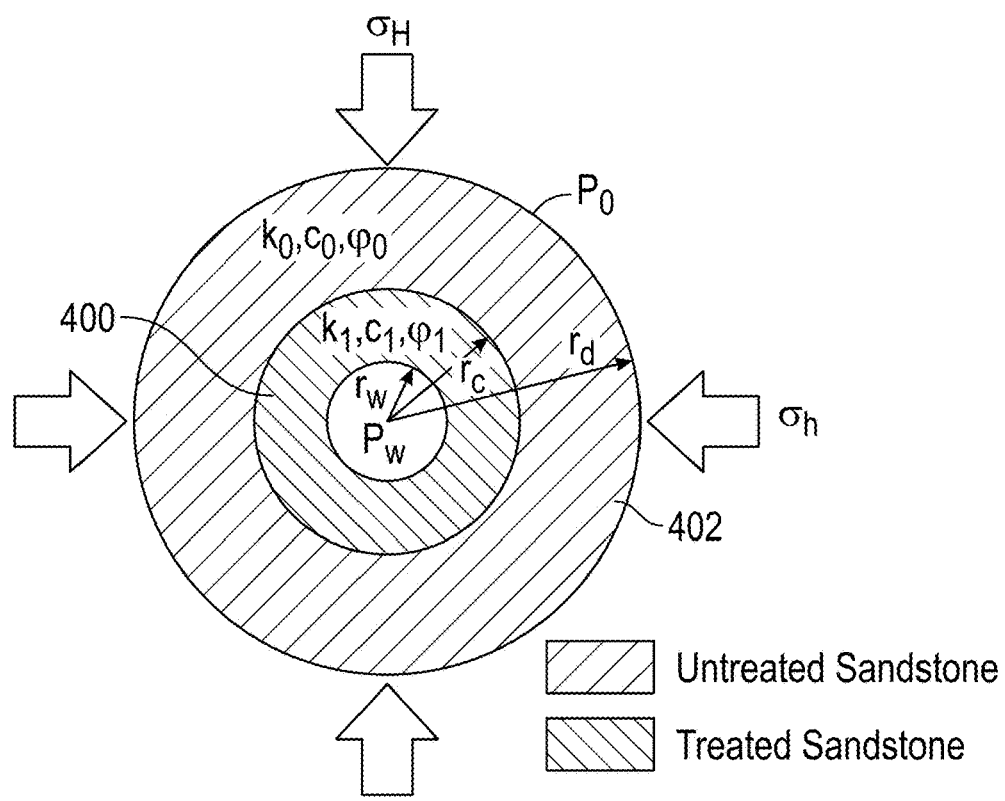
FIG. 4 is an illustration of a producing well in a weak sandstone reservoir after chemical consolidation treatment in an unequal stress field according to one or more embodiments of the present disclosure.

Following chemical consolidation treatment, the permeability (k) decreases, and the mechanical strength (e.g., $S_0$) increases in the treated region. As a result, and as depicted in FIG. 4, the producing well after chemical consolidation treatment in an unequal stress field becomes a concentric double layered hollow cylinder with different permeability and mechanical strength properties in an inner layer 400 (treated sandstone) and an outer layer 402 (untreated sandstone). In the example shown in FIG. 4, the properties in the inner layer 400 are assumed to be constant.

Mechanical properties of sandstone, such as unconfined compressive strength (UCS), may be measured with uniaxial compression tests. When performing a uniaxial compression test, the load is gradually applied to the rock core plug until it fails. The load-displacement data are recorded and used to determine a stress-strain curve from which Young's modulus, Poisson's ration, and UCS may be determined. Cohesive strength and friction angle may be measured by performing two triaxial compression tests, each with a different confining stress condition. A triaxial compression test is similar to a uniaxial compression test except that a hydrostatic stress is applied in all directions first, followed by applying the load in one direction until the rock sample fails.

To perform the chemical consolidation treatment, fluid with resin material is injected into the core plug prepared with samples of sandstone from a region of interest, and the fluid flows radially outwards. For instance, the resin material may be a furan resin and/or silicate non-polymer materials. Thus, the soaking time and resin concentration in the soaking fluid of the sandstone closer to the well are greater than in the sandstone further from the well. Therefore, in the chemically treated region, mechanical strength decreases, and permeability increases gradually in the radial direction.

Figure 5A:
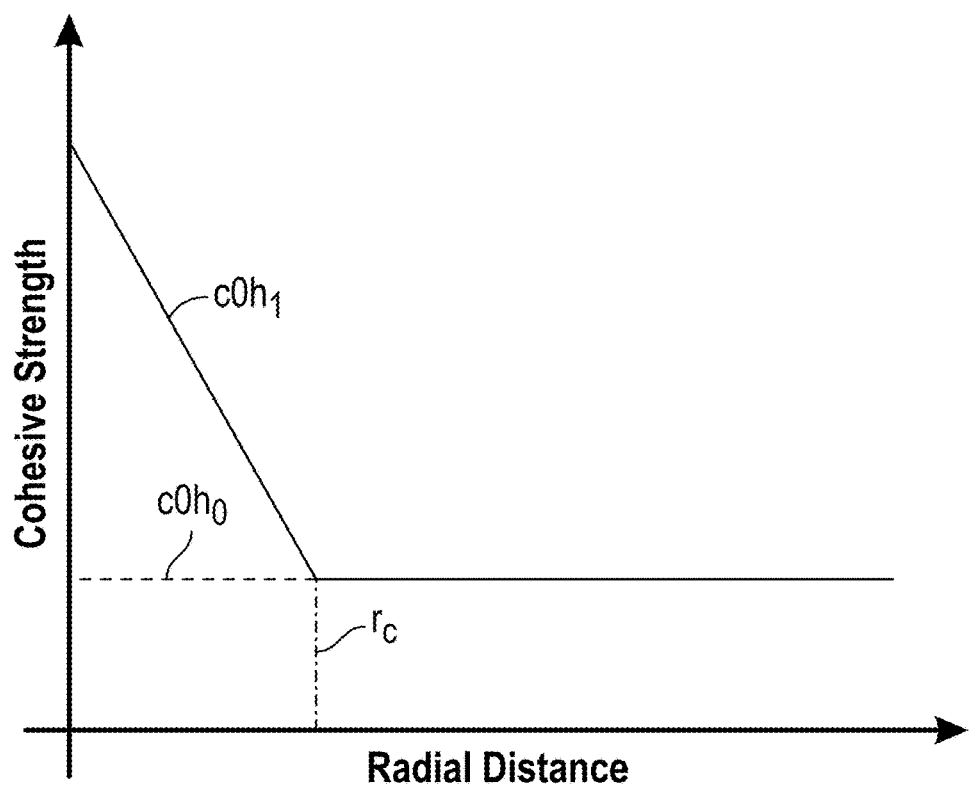
FIG. 5A is an illustration of increased strength with chemical consolidation treatment according to one or more embodiments of the present disclosure.
Figure 5B:
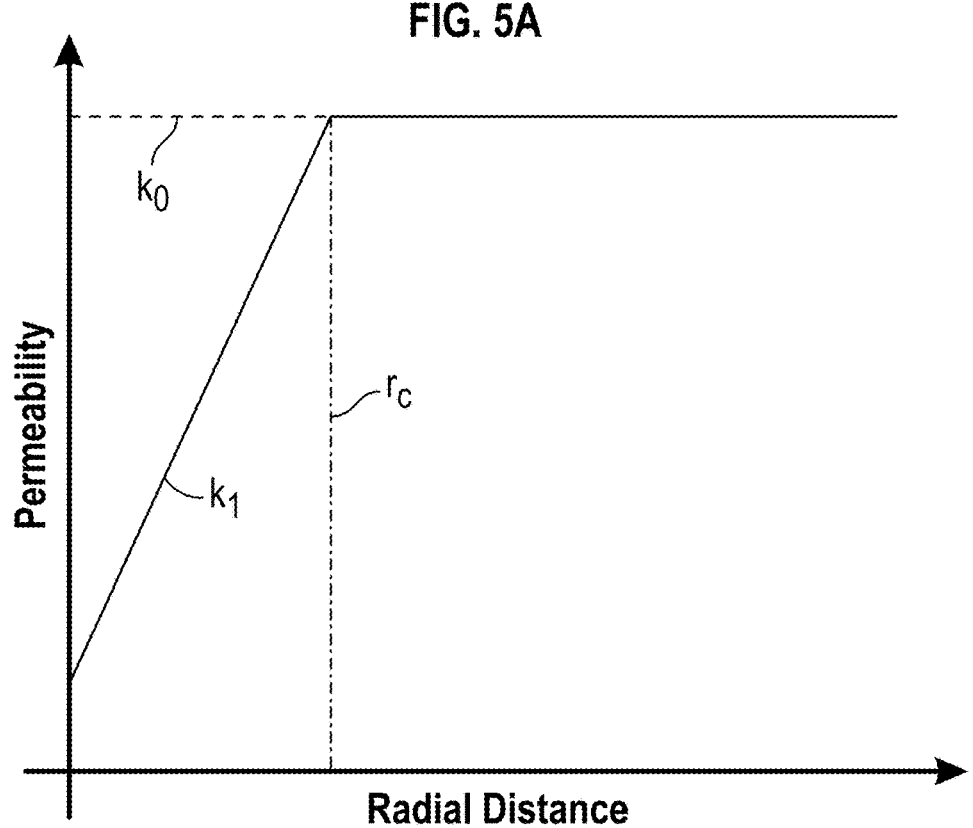
FIG. 5B is an illustration of increased degradation of permeability with chemical consolidation treatment according to one or more embodiments of the present disclosure.

FIGS. 5A and 5B illustrate enhancement of cohesive strength and degradation of permeability, respectively, with chemical consolidation treatment. Specifically, FIG. 5A shows cohesive strength is enhanced linearly with the maximum value at the wellbore surface and minimum value (same as the original cohesive strength of the weakly consolidated sandstone) at the treated-untreated interface. In one or more embodiments, mechanical strength, such as cohesive strength, is measured along the treatment depth by rock mechanics tests, such as a uniaxial compression test or a triaxial compression test. In the field of operation, treatment depth may be estimated from the injected volume of the treatment fluid. In experimental lab studies, treatment depth may be determined by examining the core following the test.

FIG. 5B shows that permeability reduces linearly in the chemical consolidation treated region with the minimum value at the wellbore surface and maximum value at the treated-untreated interface. As illustrated in FIGS. 5A and 5B, the radius $r_c$ is the radius at which no further changes occur in the mechanical properties (cohesive strength, permeability) of the well.

(3.3) Heterogeneity

Figure 6:
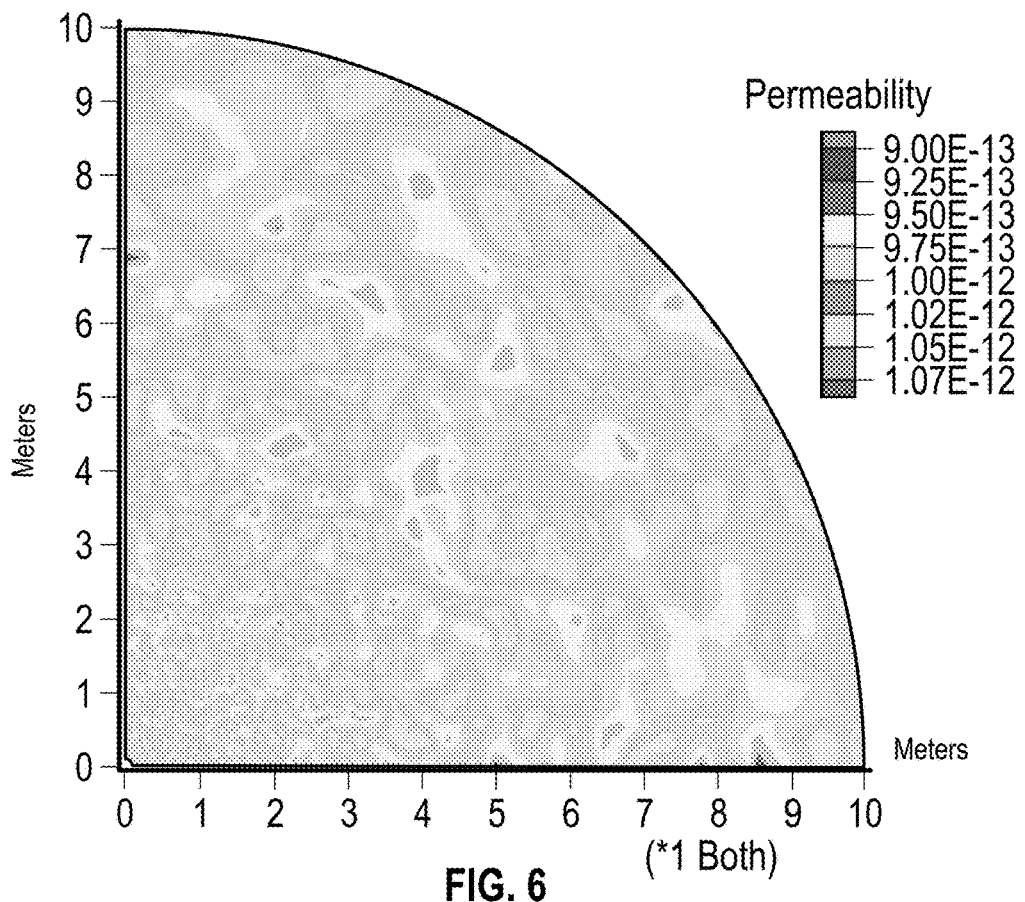
FIG. 6 is an illustration of heterogeneity of permeability of sandstone around a well bore at meter-scale according to one or more embodiments of the present disclosure.

Rocks are heterogeneous materials in nature. The value of properties, such as permeability, measured in lab tests is the averaged value of the tested sample. FIG. 6 shows the heterogeneity of permeability of sandstone around a well at meter-scale, with an average value of 1 milli-Darcy (mD) ($1 \times 10^{-12}$ m$^2$) and a deviation of 0.1 milli-Darcy ($1 \times 10^{-13}$ m$^2$) at millimeter scale measurements. Although the heterogeneity of sandstones is not as strong as shales, the influence of heterogeneity cannot be ignored in many sandstone reservoirs.

(3.4) Stress Dependent Permeability and Porosity

As discussed, a decrease of well fluid pressure causes effective stress to increase, which causes rock mass to contract. The porosity decreases and, subsequently, the permeability decreases. Since the stress changes may differ from one location to another, permeability reduction may differ as well. The stress dependence of porosity and permeability of rocks has been extensively experimented in the lab and reported in the literature.

For instance, in "The Effect of Overburden Pressure on Relative Permeability", In Middle East Oil Show, OnePetro (which is hereby incorporated by reference as though fully set forth herein), Ali et al. proposed the following equation to describe the stress dependence of Berea sandstone:

$$\frac{k}{k_i} = 1.147 P^{-0.02953}, \quad (3)$$

where k is the permeability in millidarcy (mD) measured at pressure P in pounds per square inch (psi), and $k_i$ is the core permeability at a reference pressure of 100 psi. Permeability may be measured on core plugs using core flooding tests. In one or more embodiments, multiple core plugs may be cut from the treatment core along the treatment depth.

(4) Method for Managing Sand Risk

Figure 7:
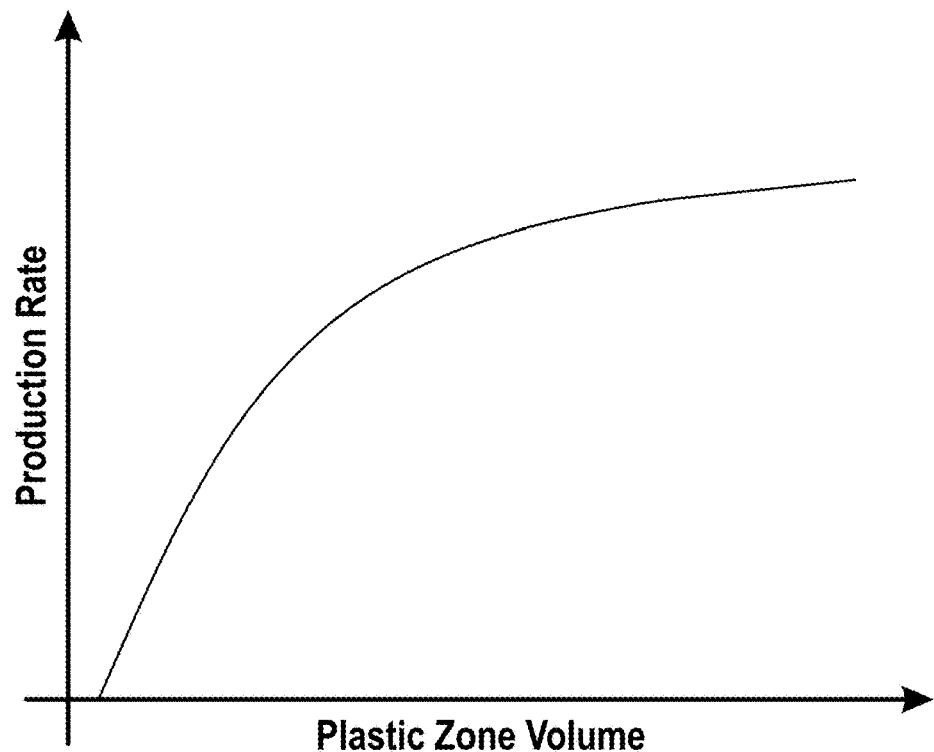
FIG. 7 is an illustration of a relationship between production rate and plastic zone size according to one or more embodiments of the present disclosure.

As discussed, embodiments of this disclosure are directed to a method of managing sand risk by generating a curve that represents the relationship between production/flow rate and plastic zone size/volume (hereinafter referred to as the flow rate-plastic zone volume curve) for a producing well of interest. The curve is generated through a combination of field data, lab experiments, and computational simulation. Primary affecting factors are measured in the field or laboratories and integrated in a hydromechanical elastoplastic simulator. Non-limiting examples of primary affecting factors include the anisotropy and magnitudes of in-situ stresses and reservoir pressure, the heterogeneity of material properties, the treatment depth of chemical consolidation, the treatment effect on the rock strength and permeability, and stress-dependence of porosity and permeability. FIG. 7 illustrates a relationship between production rate and plastic zone size. The determined relationship may be used as a reference for production engineers to choose a production rate for managing the expectation on sanding volume.

Figure 8:
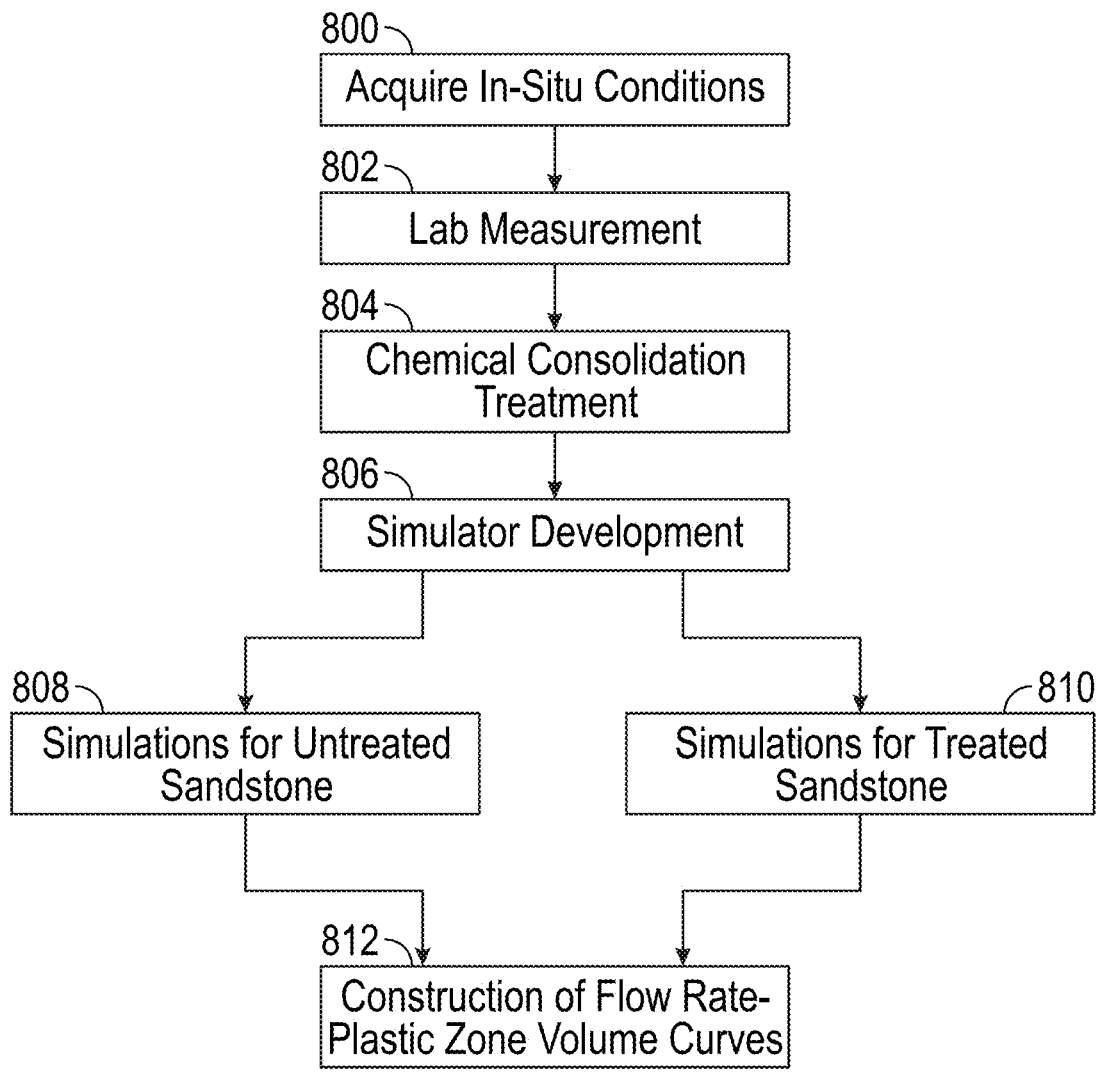
FIG. 8 is a flow diagram illustrating a method for developing flow rate-plastic zone volume curves for a producing well in a weak sandstone reservoir according to one or more embodiments of the present disclosure.

The workflow for developing the predictive curve is depicted in FIG. 8. The predictive curve is used to determine a correlation between a well flow rate and the effect of the chemical consolidation treatment. The specific steps are summarized as follows. In block 800, in situ information, including stresses, reservoir pore pressure, thickness of sandstone layer, and borehole radius, is acquired. In block 802, conventional rock tests are performed on sandstone samples to measure mechanical properties (e.g., Young's modulus, Poisson's ratio, uniaxial compressive strength (UCS), friction angle, tensile strength), hydraulic properties (e.g., porosity, permeability), and stress-dependence of permeability.

In block 804, a chemical consolidation treatment is performed. The chemical consolidation treatment may include injecting a volume of treatment fluid into one or more samples under conditions representative of downhole conditions. The samples may include sandstone from a regions of interest packed into core plugs. The treatment fluid is allowed to soak into the one or more samples for a predetermined amount of time (e.g., 1 minute, 5 minutes, 15 minutes, 1 hour, 2 hours, 18 hours, 24 hours, 48 hours). Then, chemical treatment depth, variations of cohesive strength, and permeability along the treatment depth are measured. In block 806, the simulator is developed. A computational mesh is generated. Mesh generation subdivides a solution domain into a mesh of small regions. Heterogeneity material properties are assigned to corresponding regions in the computational mesh. Initial and boundary conditions are applied, and simulation modes are set. The in-situ stresses and pore pressure in the formation may be used as the initial conditions in the simulator model. In addition, the in-situ stresses and pore pressure may be applied as the boundary condition at the far-field. The target wellbore pressure in the production is applied inside the borehole as the downhole boundary condition. In one or more embodiments, block-structured mesh generation is performed, where a block is generated, and a function is developed to adjust the coordinates of each grid-point to form a quarter cylindrical mesh.

In block 808, a simulation is performed for untreated sandstone. The following conditions may be simulated: fluid-mechanical coupling, stress-dependence of porosity and permeability, and plastic zone size/volume for various flow rates. In block 810, a simulation is performed for treated sandstone. As with the untreated simulation, fluid-mechanical coupling, stress-dependence of porosity and permeability, and plastic zone size/volume for various flow rates are simulated. In addition, cohesive strength and permeability conditions for the treated region are updated in the simulation of the treated sandstone. In block 812, flow rate-plastic zone volume curves are generated for the two series of simulations described above, including a no treatment simulation and a chemical consolidation treatment simulation.

(5) Exemplary Embodiment

The following is an example of applying the method to develop a production rate corresponding to the flow rate-plastic zone volume curve for a producing well in a weak sandstone formation according to an embodiment of the present disclosure. First, well and field information were collected (corresponding to block 800 in FIG. 8) as follows:

Vertical well radius: $R_i$=0.1 m;
Drainage radius: $R_o$=10 m;
Sandstone thickness: h=1 m;
Vertical stress: $\sigma_{z0}$=65.5 MPa;
Horizontal stress: $\sigma_{x0}$=$\sigma_{y0}$=59.5 MPa; and
Origin reservoir pressure: $P_o$=32.1 MPa.

Next, conventional lab tests were performed to measure material properties (corresponding to block 802 in FIG. 8) with the following results:

Poisson's ratio: $\nu$=0.35;
Cohesive strength: $S_0$=101.4 KPa;
Friction angle: $\varphi$=30°;
Permeability: k=1×10$^{-13}$ m$^2$ (0.1 Darcy); and
Fluid viscosity: $\mu$=0.001 Pa·s.

Subsequently, chemical consolidation tests were performed (corresponding to block 804 in FIG. 8) with the following results:

Treatment depth: $R_c$=1 m;
Cohesive strength: $S_0$=500 kilopascal (KPa) at well surface to 101 KPa at a depth of 1 meter (m)); and
Permeability: $k_1$=0.02 Darcy at well surface to 0.1 Darcy at depth of 1 m.

In one or more embodiments, chemical consolidation tests are performed in a core flooding test device, where chemicals (e.g., furan resin, silicate non-polymer materials) are injected into a sand pack at a pre-determined stress, pore pressure, and temperature representing a downhole condition. Alternatively, chemical consolidation tests may be performed using a slurry consolidation device in which resin liquid is mixed with sand to form a uniform slurry in a container. The slurry is then transferred to a cylindrical steel test tube to set under desired stress and temperature conditions.

Figure 9:
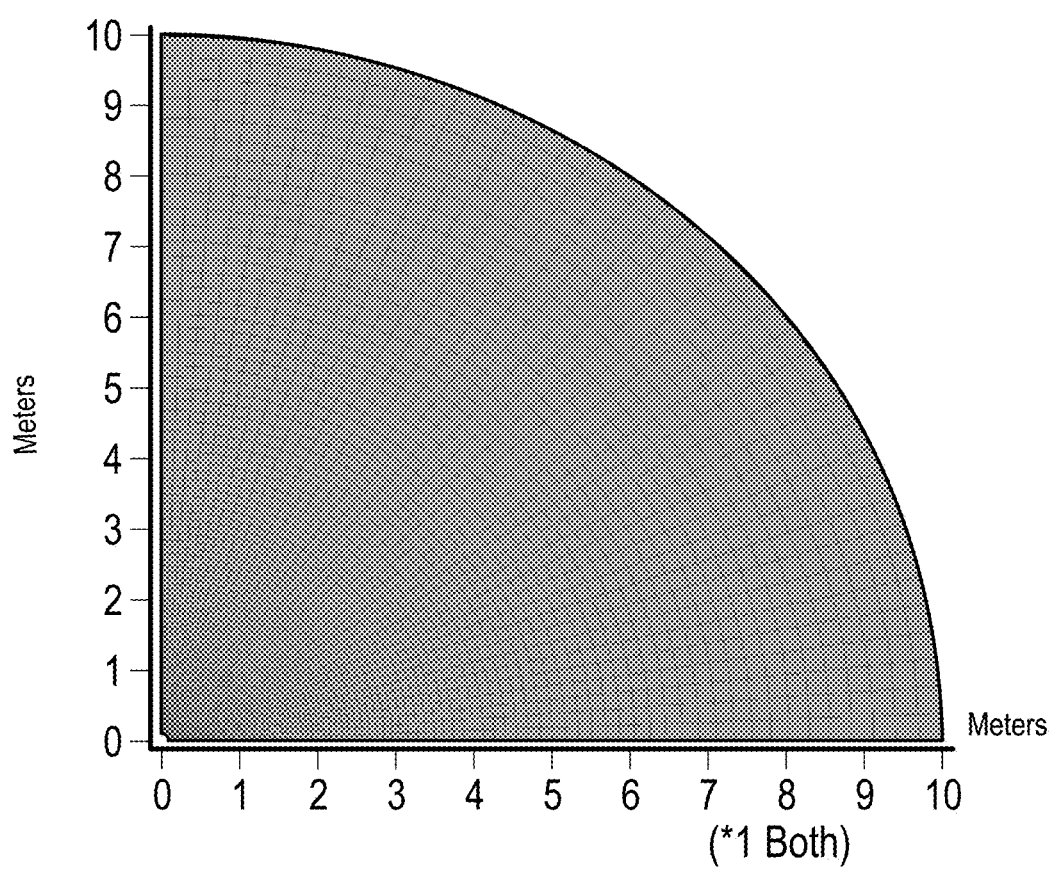
FIG. 9 is an illustration of a computational mesh of the simulator according to one or more embodiments of the present disclosure.

Next, the simulator was developed (corresponding to block 806 in FIG. 8). Because this problem is symmetric on the x-axis and y-axis, as illustrated in FIGS. 1A, 1B, 3A, and 3B, only one quarter of the problem needs to be modeled. A computational mesh was generated as shown in FIG. 9. The radius of the hole at the center is 0.1 m, and the radius of the outer boundary is 10 m. The density, mechanical, and hydraulic properties above were assigned to regions in the computational mesh. The heterogeneity of sandstone properties was handled at this stage. The bottom boundary was fixed in the y-direction, and the left boundary was fixed in the x-direction to reflect the existence of symmetric lines. The outer circular boundary was loaded by the in-situ stresses ($\sigma_{x0}$, $\sigma_{y0}$) of 59.5 MPa and an origin reservoir pore pressure ($P_o$) of 32.1 MPa. Different well fluid pressures were applied to measure the corresponding plastic zone radii/volumes. For example, the wellbore pressure may be reduced from 32 MPa to 20 MPa over ten stages, where the plastic zone radius/volume is measured at each stage.

Figure 10B:
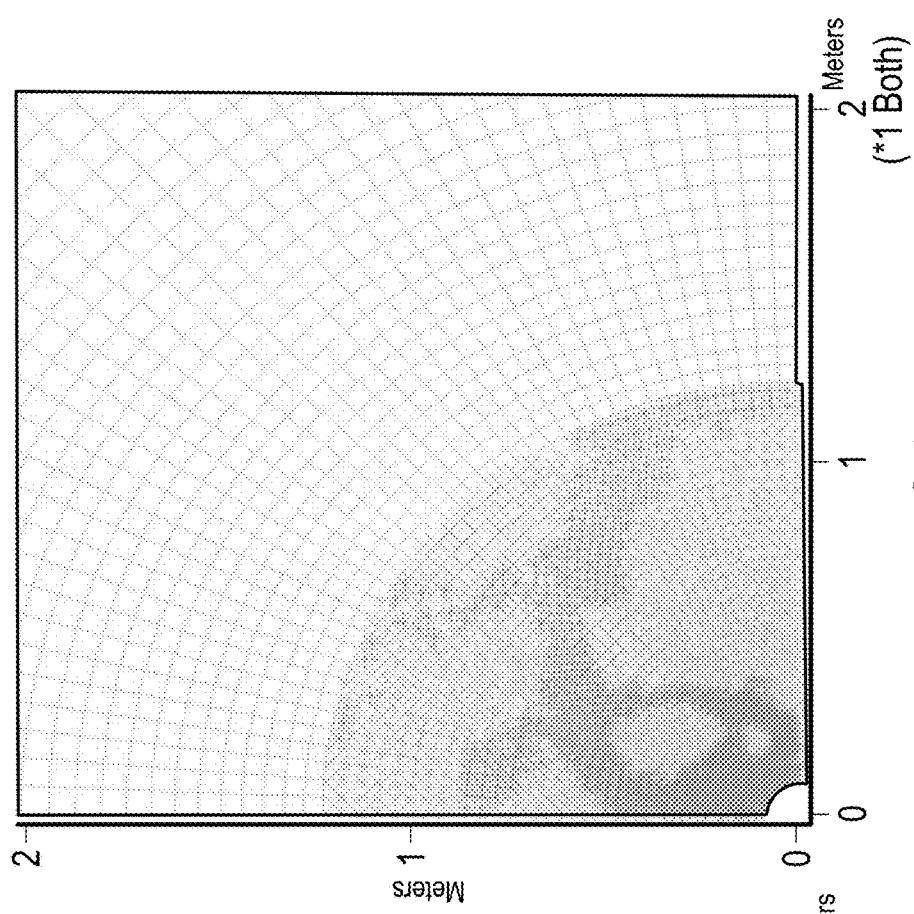
FIG. 10B illustrates a plastic zone at a flow rate of $1 \times 10^{-4}$ m$^3$/sec without chemical consolidation treatment according to one or more embodiments of the present disclosure.
Figure 10A:
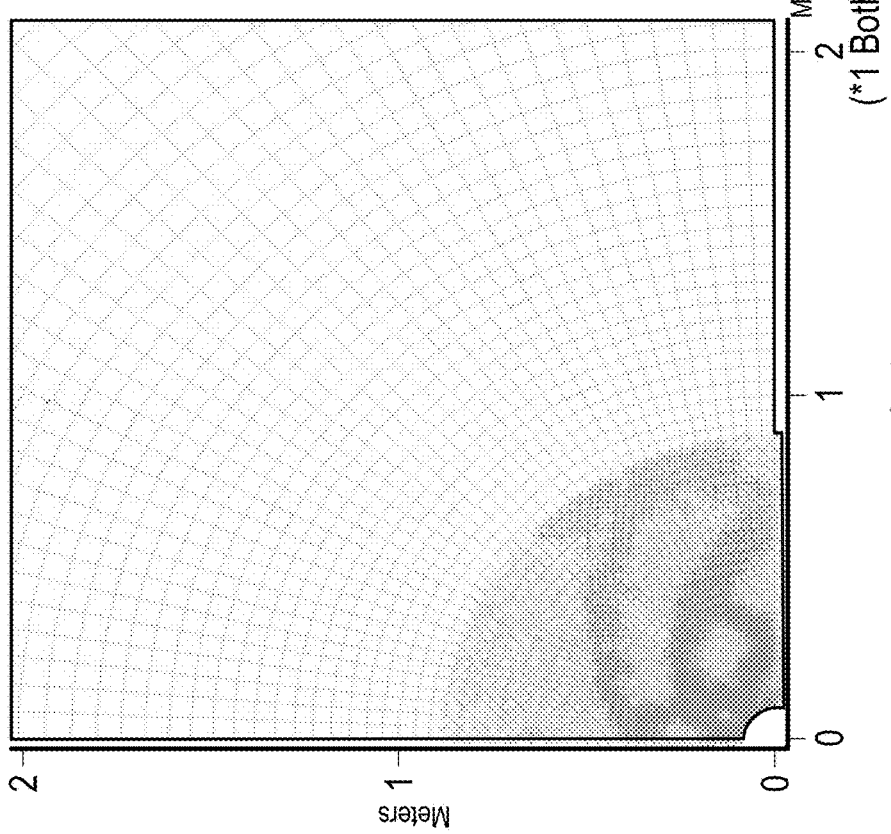
FIG. 10A illustrates a plastic zone at a flow rate of 0 without chemical consolidation treatment according to one or more embodiments of the present disclosure.

Following development of the simulator, simulations without chemical consolidation treatment were performed (corresponding to block 808 in FIG. 8). The target was to calculate the plastic zone volume at different production rates (e.g., q=0, 2×10$^{-5}$, 2×10$^{-5}$, 2×10$^{-5}$, . . . , 20×10$^{-5}$ m$^3$/sec). First, the well production/flow rate in the well was set to zero. Then, both fluid flow and mechanical calculation modes were turned on. Fluid flow calculation was performed for one step. Next, the system was solved to mechanical equilibrium. The stress-dependent properties, such as permeability, were updated using the current stress state and may be updated in the next fluid flow calculation. The simulation stopped until fluid flow reached steady state. Subsequently, the plastic zone radius/volume was measured, the well production rate was updated with the next target value in the list, and the process proceeded with turning on the fluid flow and mechanical calculation modes again. FIG. 10A shows the calculated plastic zone region for q=0. FIG. 10B shows the calculated plastic zone region for q=1×10$^{-4}$ m$^3$/sec. The simulation results indicated that the plastic zone radius was 0.9 m before any production (FIG. 10A). The plastic zone radius increased to 1.2 m (FIG. 10B) following production. In FIGS. 10A and 10B, more concentrated shaded areas indicate regions where the formation is currently running into plastic damage. Less concentrated shaded areas indicate regions where the formation ran into plastic damage in the past.

Figure 11B:
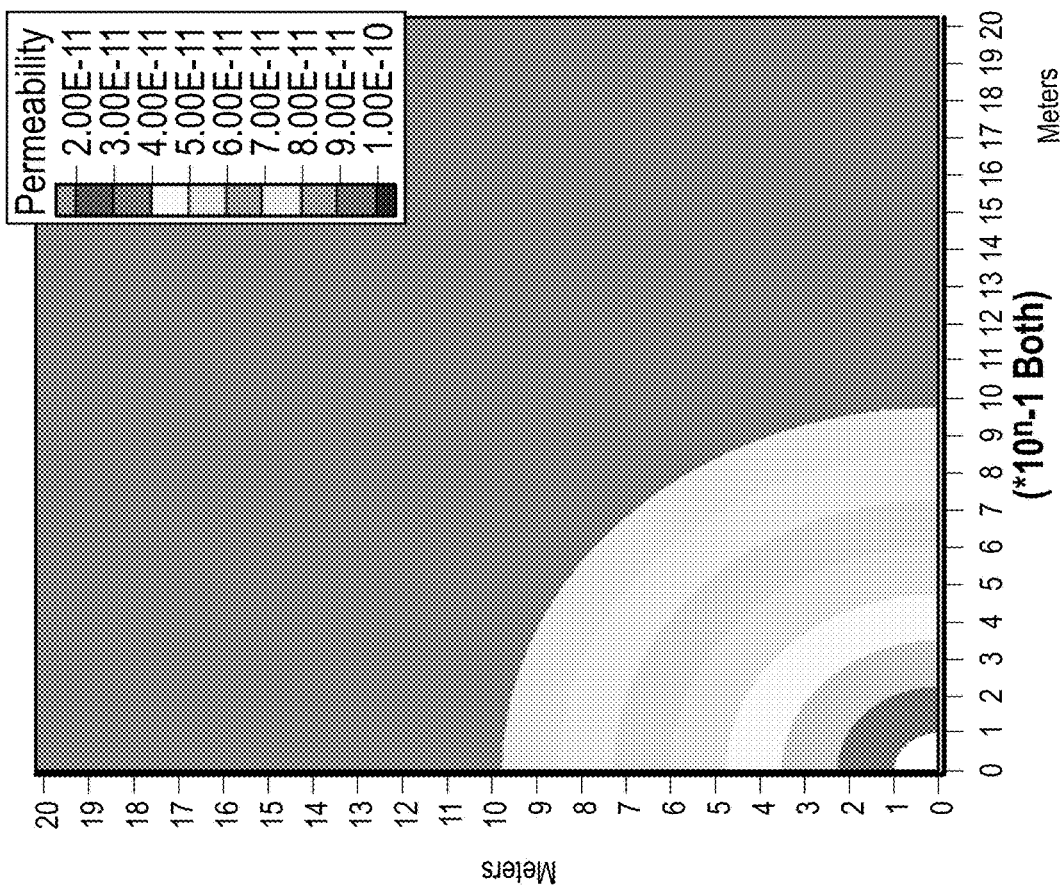
FIG. 11B illustrates gradual variations of permeability in a radial direction due to chemical consolidation treatment according to one or more embodiments of the present disclosure.
Figure 11A:
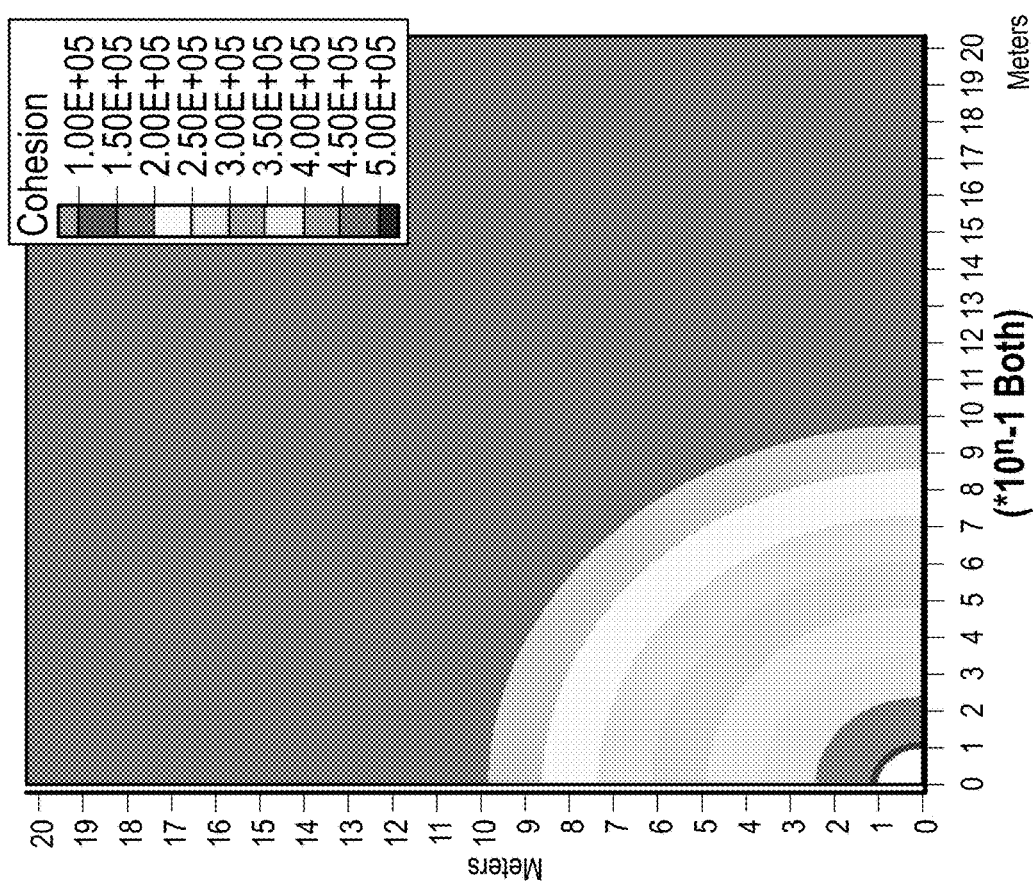
FIG. 11A illustrates gradual variations of cohesive strength in a radial direction due to chemical consolidation treatment according to one or more embodiments of the present disclosure.
Figure 12B:
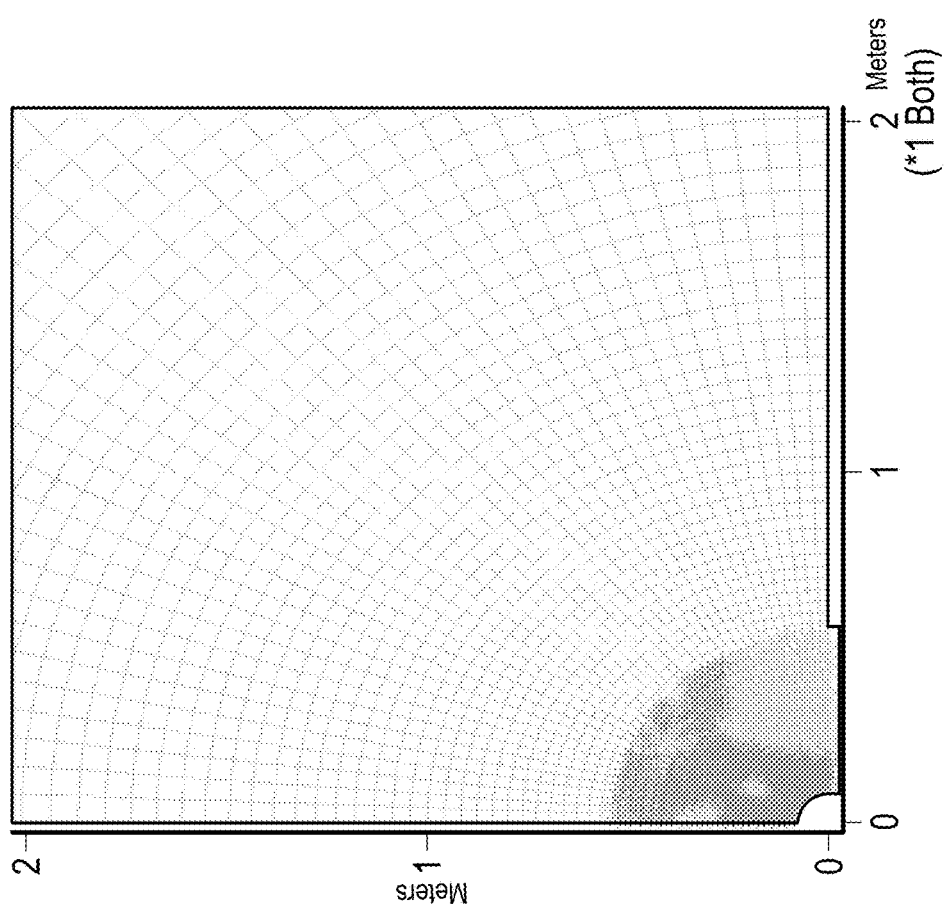
FIG. 12B illustrates a plastic zone at a flow rate of $1 \times 10^{-4}$ m$^3$/sec with chemical consolidation treatment according to one or more embodiments of the present disclosure.
Figure 12A:
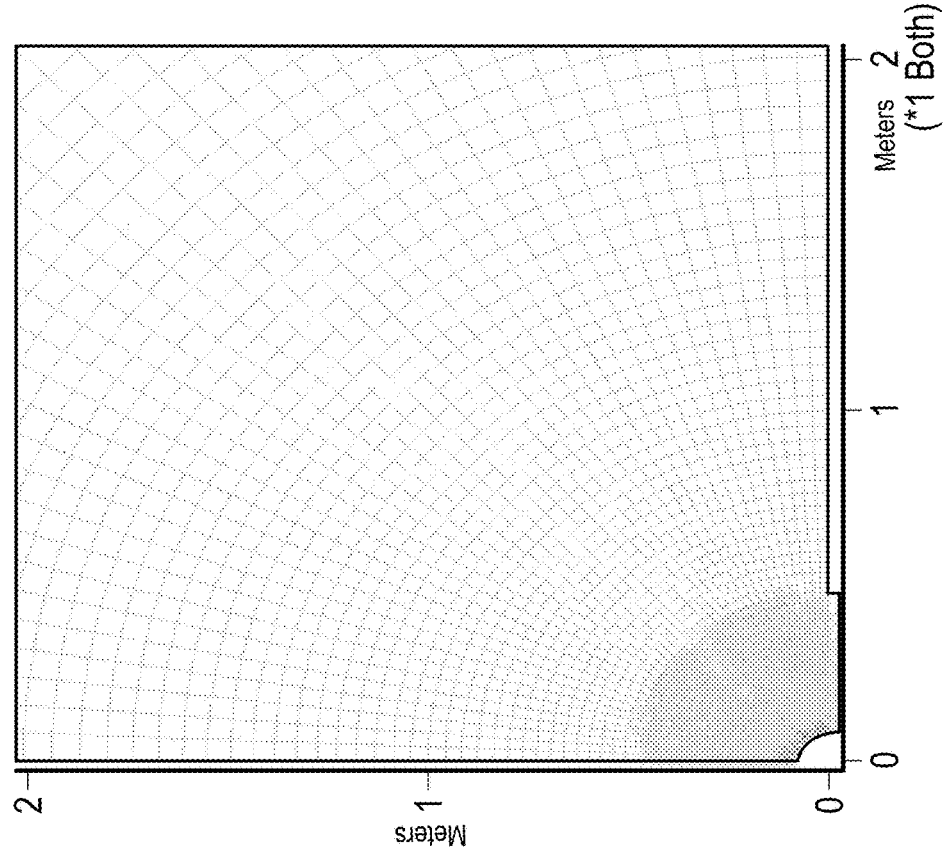
FIG. 12A illustrates a plastic zone at a flow rate of 0 with chemical consolidation treatment according to one or more embodiments of the present disclosure.

Simulations with chemical consolidation treatment were next performed (corresponding to block 810). The lab-measured changes in cohesive strength and permeability introduced by the chemical consolidation were used to update the cohesion and permeability of the material within the radial distance of 1 m. After the update, the cohesion and permeability values varied with the radial distance, as shown in FIGS. 11A and 11B, respectively. The simulation procedure for developing the flow rate-plastic zone volume curve with chemical consolidation treatment was the same as in block 808. The calculated plastic zone region is displayed in FIG. 12A for q=0 and FIG. 12B for q=1×10$^{-4}$ m$^3$/sec. The simulation results indicated that the plastic zone radius was 0.44 m before any production (FIG. 12A) and increased to 0.52 m (FIG. 12 B). In FIGS. 12A and 12B, more concentrated shaded areas indicate regions where the formation is currently running into plastic damage. Less concentrated shaded areas indicate regions where the formation ran into plastic damage in the past.

Figure 13:
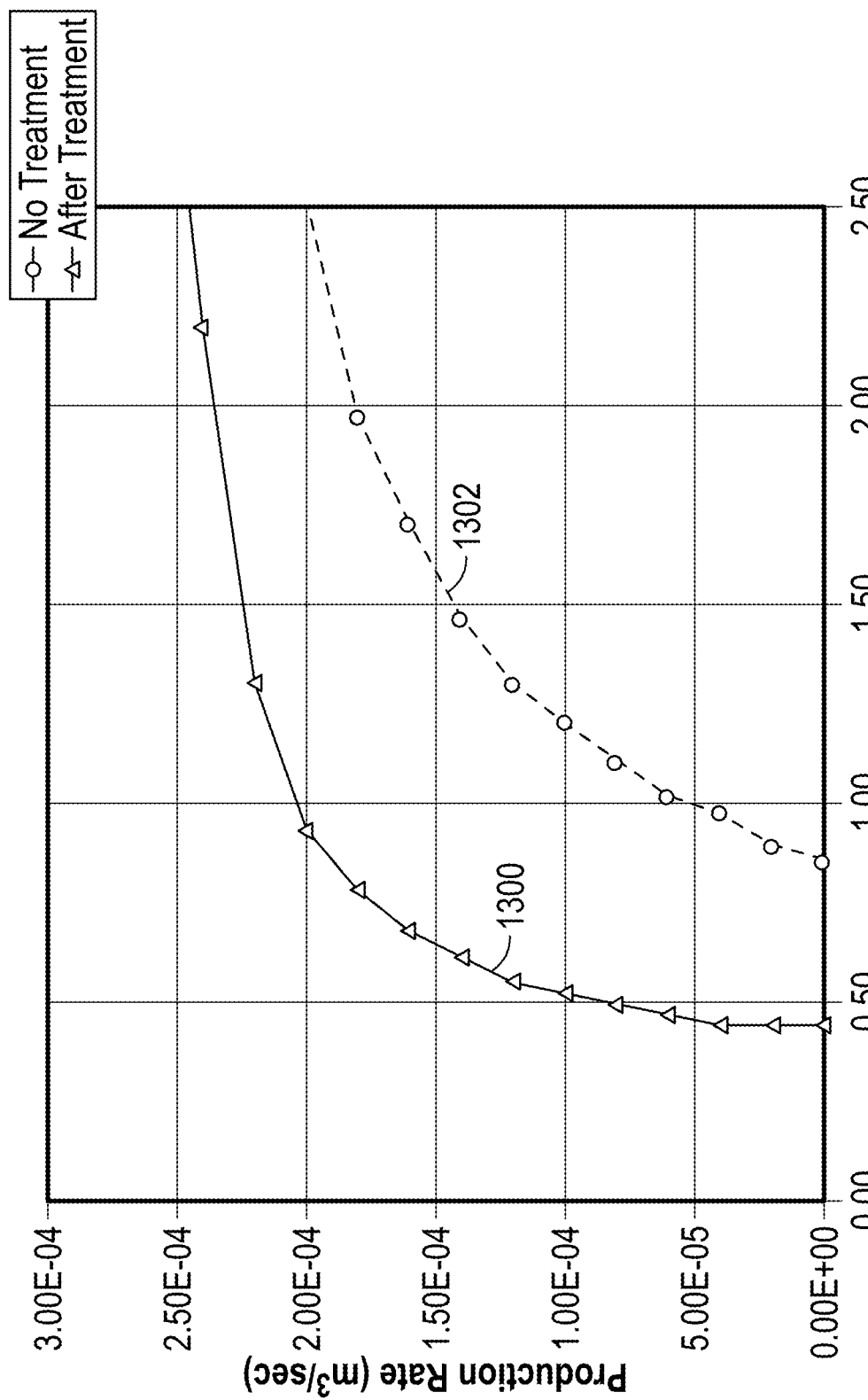
FIG. 13 illustrates developed flow rate-plastic zone volume curves according to one or more embodiments of the present disclosure.

The developed flow rate-plastic zone volume curves with (1300) and without (1302) chemical consolidation treatment are presented in FIG. 13. As seen, the chemical consolidation treatment is very effective in controlling sand production volume or enhancing production rate. For example, if one wishes to control the plastic zone radius to be less than 1 meter, without chemical consolidation treatment, the maximum production rate may be 6×10$^{-5}$ m$^3$/sec. With chemical consolidation treatment, the production rate may be safely elevated to 20×10$^{-5}$ m$^3$/sec.

While the example described above demonstrates how chemical consolidation treatment affects the flow rate-plastic zone volume curve, other factors including, but not limited to, stress-dependence of permeability and porosity and heterogeneous material properties may be accommodated in the simulation model. The impact of any factor may be reflected in the computed flow rate-plastic zone volume curve from a corresponding simulation.

Figure 14:
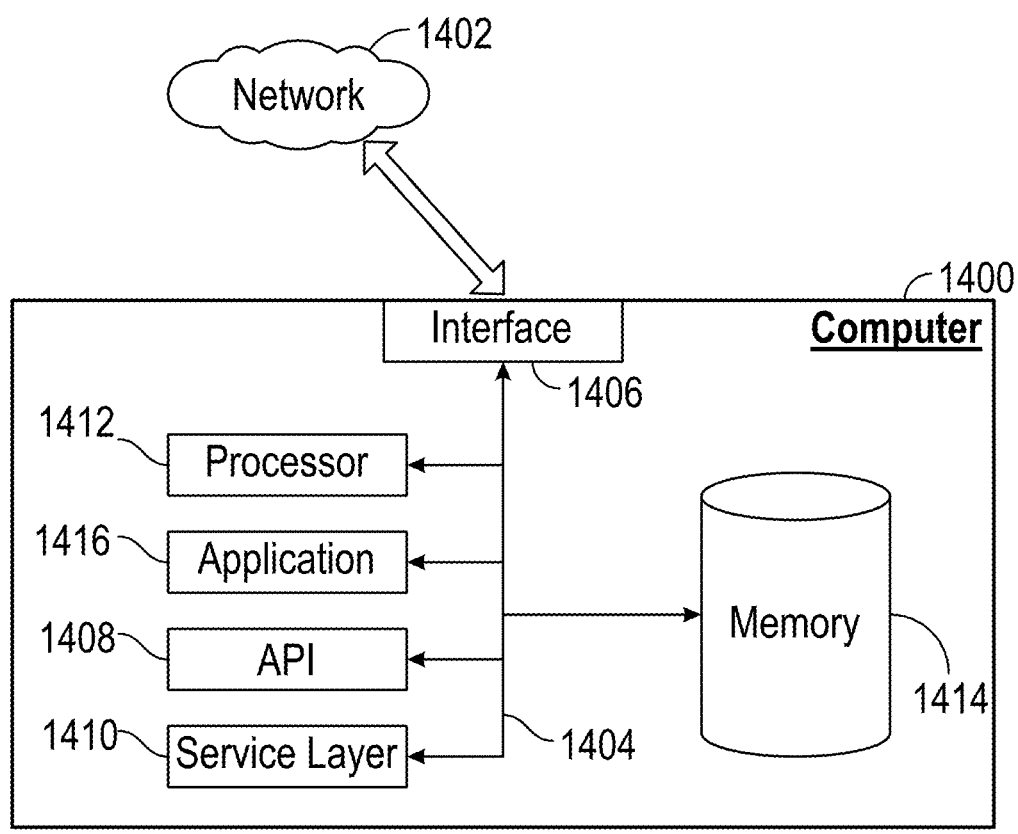
FIG. 14 illustrates a computing system according to one or more embodiments of the present disclosure.

FIG. 14 depicts a block diagram of a computer 1400 used to provide computational functionalities associated with simulations, algorithms, methods, functions, processes, flows, and procedures as described in this disclosure, according to one or more embodiments. The illustrated computer 1400 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1400 may include an input device, such as a keypad, keyboard, touch screen, or other device that can accept user information, and an output device that conveys information associated with the operation of the computer 1400, including digital data, visual, or audio information (or a combination of information), or a GUI.

The computer 1400 can serve in a role as a client, network component, a server, a database or other persistency, or any other component (or a combination of roles) of a computer system for performing the subject matter described in the instant disclosure. The illustrated computer 1400 is communicably coupled with a network 1402. In some implementations, one or more components of the computer 1400 may be configured to operate within environments, including cloud-computing-based, local, global, or other environment (or a combination of environments).

At a high level, the computer 1400 is an electronic computing device operable to receive, transmit, process, store, or manage data and information associated with the described subject matter. According to some implementations, the computer 1400 may also include or be communicably coupled with an application server, e-mail server, web server, caching server, streaming data server, business intelligence (BI) server, or other server (or a combination of servers).

The computer 1400 can receive requests over network 1402 from a client application (for example, executing on another computer 1400 and responding to the received requests by processing the said requests in an appropriate software application. In addition, requests may also be sent to the computer 1400 from internal users (for example, from a command console or by other appropriate access method), external or third-parties, other automated applications, as well as any other appropriate entities, individuals, systems, or computers.

Each of the components of the computer 1400 can communicate using a system bus 1404. In some implementations, any or all of the components of the computer 1400, both hardware or software (or a combination of hardware and software), may interface with each other or the interface 1406 (or a combination of both) over the system bus 1404 using an application programming interface (API) 1408 or a service layer 1410 (or a combination of the API 1408 and service layer 1410. The API 1408 may include specifications for routines, data structures, and object classes. The API 1408 may be either computer-language independent or dependent and refer to a complete interface, a single function, or even a set of APIs. The service layer 1410 provides software services to the computer 1400 or other components (whether or not illustrated) that are communicably coupled to the computer 1400. The functionality of the computer 1400 may be accessible for all service consumers using this service layer. Software services, such as those provided by the service layer 1410, provide reusable, defined business functionalities through a defined interface. For example, the interface may be software written in JAVA, C++, or other suitable language providing data in extensible markup language (XML) format or another suitable format. While illustrated as an integrated component of the computer 1400, alternative implementations may illustrate the API 1408 or the service layer 1410 as stand-alone components in relation to other components of the computer 1400 or other components (whether or not illustrated) that are communicably coupled to the computer 1400. Moreover, any or all parts of the API 1408 or the service layer 1410 may be implemented as child or sub-modules of another software module, enterprise application, or hardware module without departing from the scope of this disclosure.

The computer 1400 includes an interface 1406. Although illustrated as a single interface 1406 in FIG. 14, two or more interfaces 1406 may be used according to particular needs, desires, or particular implementations of the computer 1400. The interface 1406 is used by the computer 1400 for communicating with other systems in a distributed environment that are connected to the network 1402. The interface 1406 includes logic encoded in software or hardware (or a combination of software and hardware) and operable to communicate with the network 1402. More specifically, the interface 1406 may include software supporting one or more communication protocols associated with communications such that the network 1402 or interface's hardware is operable to communicate physical signals within and outside of the illustrated computer 1400.

The computer 1400 includes at least one computer processor 1412. Although illustrated as a single computer processor 1412 in FIG. 14, two or more processors may be used according to particular needs, desires, or particular implementations of the computer 1400. Generally, the computer processor 1412 executes instructions and manipulates data to perform the operations of the computer 1400 and any algorithms, methods, functions, processes, flows, and procedures as described in the instant disclosure.

The computer 1400 also includes a memory 1414 that holds data for the computer 1400 or other components (or a combination of both) that can be connected to the network 1402. For example, memory 1414 can be a database storing data consistent with this disclosure. Although illustrated as a single memory 1414 in FIG. 14, two or more memories may be used according to particular needs, desires, or particular implementations of the computer 1400 and the described functionality. While memory 1414 is illustrated as an integral component of the computer 1400, in alternative implementations, memory 1414 can be external to the computer 1400.

The application 1416 is an algorithmic software engine providing functionality according to particular needs, desires, or particular implementations of the computer 1400, particularly with respect to functionality described in this disclosure. For example, the application 1416 can serve as one or more components, modules, applications, etc. Further, although illustrated as a single application 1416, the application 1416 may be implemented as multiple applications 1416 on the computer 1400. In addition, although illustrated as integral to the computer 1400, in alternative implementations, the application 1416 can be external to the computer 1400.

There may be any number of computers 1400 associated with, or external to, a computer system containing computer 1400, wherein each computer 1400 communicates over network 1402. Further, the term "client," "user," and other appropriate terminology may be used interchangeably as appropriate without departing from the scope of this disclosure. Moreover, this disclosure contemplates that many users may use one computer 1400, or that one user may use multiple computers 1400.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for managing an expectation on sanding volume in weak sandstone: acquiring in situ data related to a region of sandstone proximate a well in a formation; obtaining a set of measured property data corresponding to one or more samples from the region of sandstone; performing a chemical consolidation treatment on the one or more samples; obtaining a set of chemical consolidation treatment data; supplying the set of measured property data and the set of chemical consolidation treatment data as inputs to a simulator; using the simulator, performing a first simulation with chemical consolidation treatment and a second simulation without chemical consolidation treatment; based on the first and second simulations, determining a correlation between a well flow rate and an effect of the chemical consolidation treatment; and adjusting the well flow rate based on the determined correlation.

2. The method of claim 1, wherein determining the correlation comprises generating at least one flow rate-plastic zone volume curve.

3. The method of claim 2, further comprising generating a flow rate-plastic zone curve for each of the first simulation and the second simulation.

4. The method of claim 1, wherein the effect of the chemical consolidation treatment is a change in a plastic zone volume.

5. The method of claim 1, further comprising determining a production rate for managing the expectation on sanding volume using the determined correlation as a reference.

6. The method of claim 1, wherein the simulator is a hydromechanical elastoplastic simulator.

7. The method of claim 1, wherein the in situ data comprises one or more of a tangential stress around the well, a reservoir pore pressure, a thickness of the region of sandstone, and a borehole radius.

8. The method of claim 1, wherein the set of measured property data comprises at least one of a mechanical property, a hydraulic property, a density property, and a stress-dependent permeability property.

9. The method of claim 8, wherein the mechanical property is one or more of Young's modulus, Poisson's ratio, uniaxial compressive strength (UCS), friction angle, and tensile strength.

10. The method of claim 8, wherein the mechanical property is cohesive strength, and wherein cohesive strength is measured along a treatment depth using a compression test.

11. The method of claim 10, wherein the compression test is a uniaxial compression test or a triaxial compression test.

12. The method of claim 8, wherein the hydraulic property is one or more of porosity and permeability.

13. The method of claim 1, wherein performing the chemical consolidation treatment comprises:
injecting a volume of treatment fluid into the one or more samples under conditions representative of downhole conditions, wherein the treatment fluid comprises a resin material;
allowing the treatment fluid to soak into the one or more samples for a predetermined length of time prior to obtaining the set of chemical consolidation treatment data.

14. The method of claim 1, wherein obtaining the set of chemical consolidation treatment data comprises measuring one or more of a treatment depth, variations of cohesive strength, and permeability along the treatment depth.

15. The method of claim 1, further comprising developing the simulator, wherein developing the simulator comprises:
generating a computational mesh having a plurality of regions;
assigning the set of measured property data to the plurality of regions of the computational mesh; and
setting initial conditions and boundary conditions.

16. The method of claim 15, wherein density properties, mechanical properties, and hydraulic properties are assigned to the plurality of regions of the computational mesh.

17. The method of claim 15, wherein the initial conditions comprise one or more of in-situ stresses and pore pressure in the formation.

18. The method of claim 15, wherein the computational mesh is a quarter cylindrical mesh.

19. The method of claim 1, wherein performing the first and second simulations comprises simulating one or more of a fluid-mechanical coupling, a stress-dependent porosity, a stress-dependent permeability, and a plastic zone volume for various flow rates.

* * * * *